Jan. 21, 1930.    R. G. WEDEMANN    1,744,253
FOLDABLE FRAME
Filed May 5, 1927    3 Sheets-Sheet 1
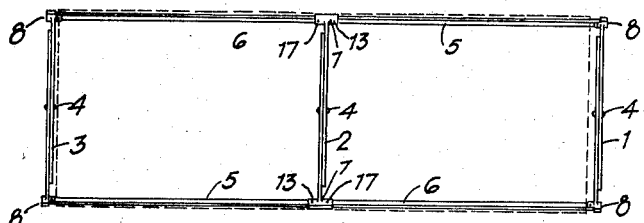
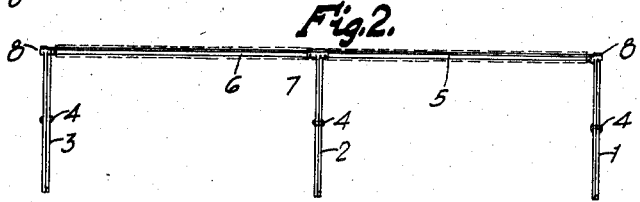
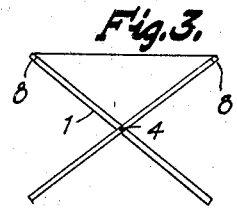
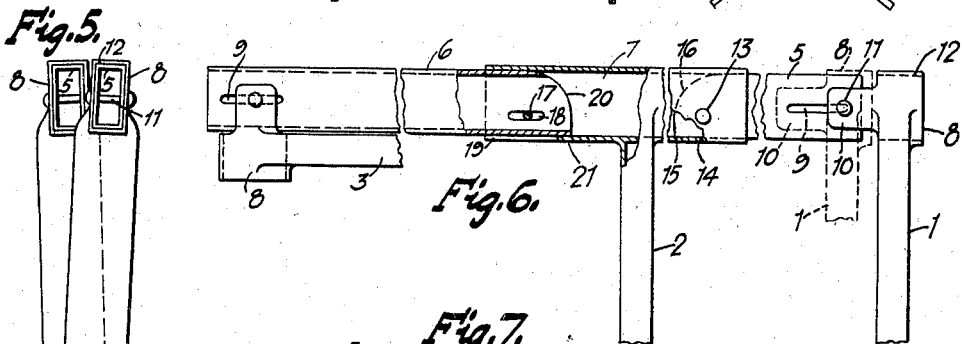
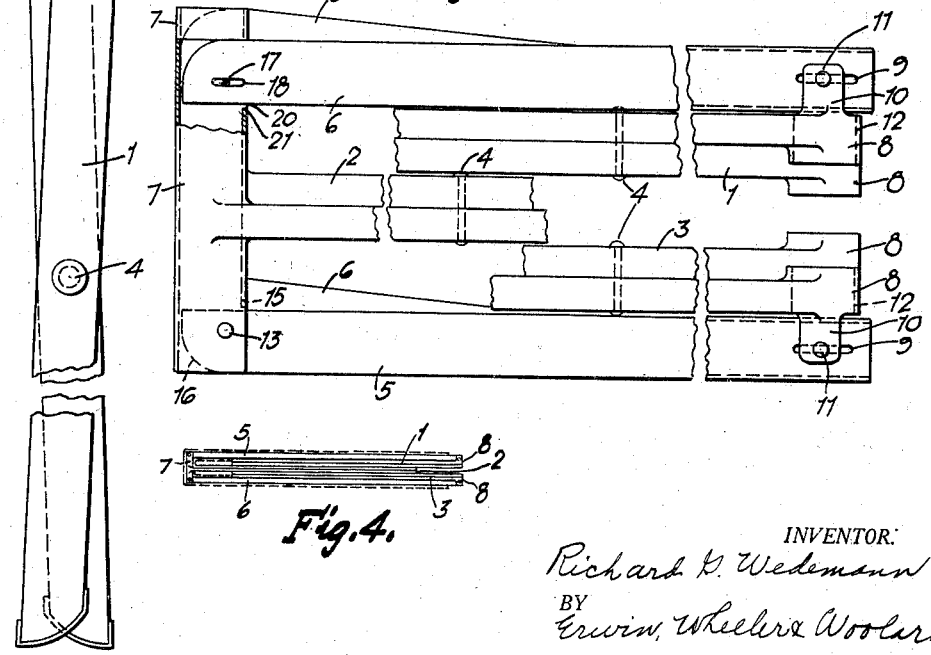
INVENTOR.
Richard G. Wedemann
BY
Erwin, Wheeler & Woolard
ATTORNEY.

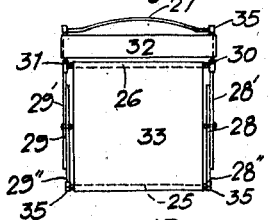
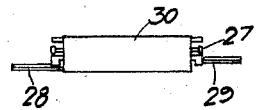
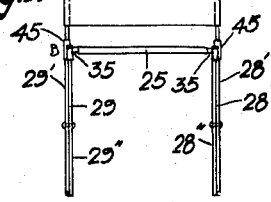
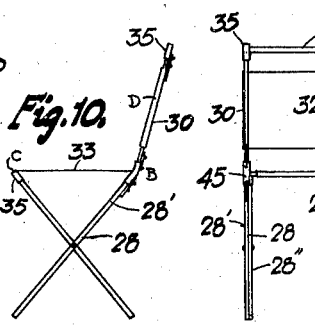
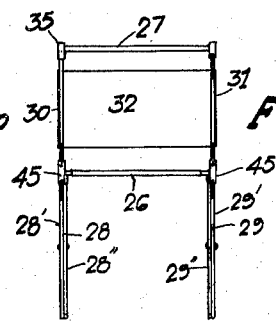
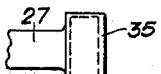
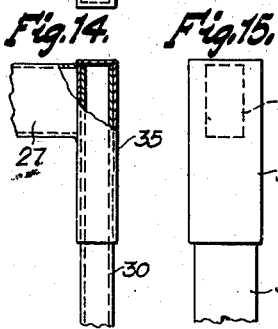
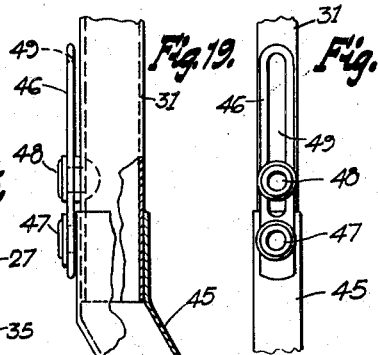
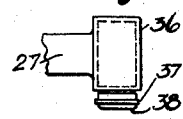
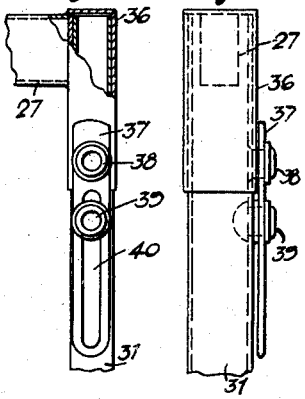
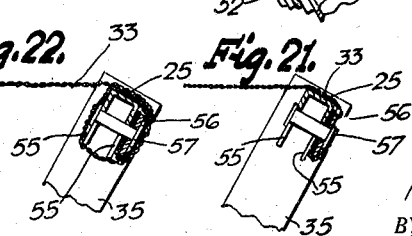

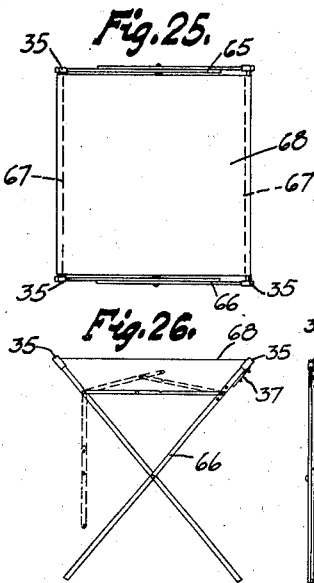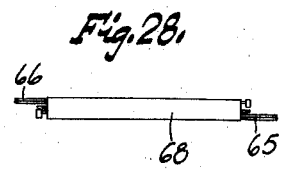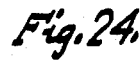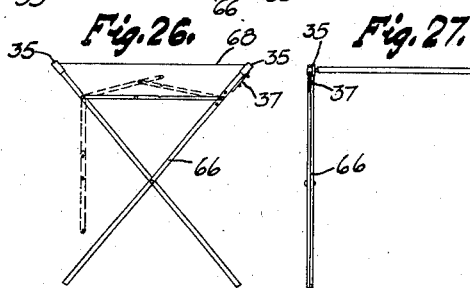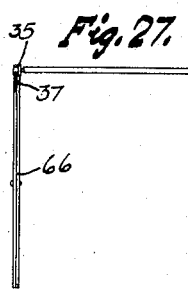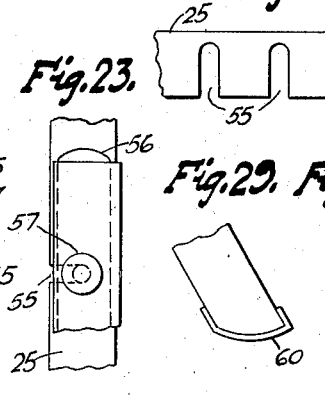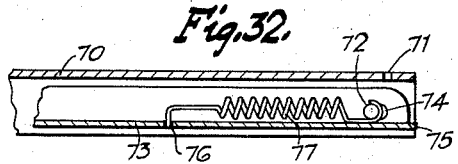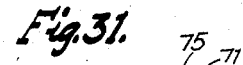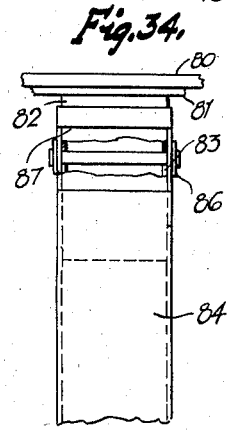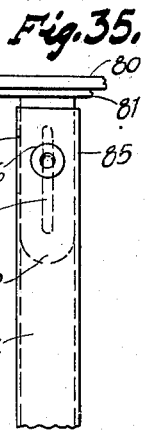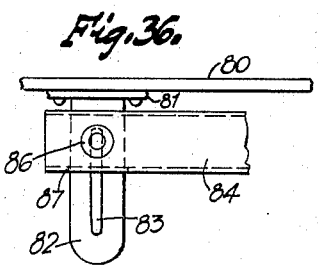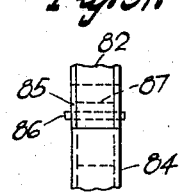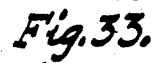

Patented Jan. 21, 1930

1,744,253

UNITED STATES PATENT OFFICE

RICHARD G. WEDEMANN, OF MILWAUKEE, WISCONSIN

FOLDABLE FRAME

Application filed May 5, 1927. Serial No. 189,128.

This invention relates to improvements in foldable frames.

It is the principal object of this invention to provide for collapsible devices, such as chairs, beds, tables and tents, a frame which may be folded into a compact unit requiring a minimum space for storage.

A further object is to provide a pair of frame members having a novel pivotal and telescopic connection with each other permitting such members in operative position to be positively joined and in folded position to be interlocked.

Other objects will appear as the description progresses.

In the drawings:—

Figure 1 is a plan view of a foldable bed frame embodying this invention.

Figure 2 is a view in side elevation of the device shown in Figure 1.

Figure 3 is an end view in side elevation of the same device.

Figure 4 is a view of the frame as it appears when folded.

Figure 5 is a greatly enlarged view in end elevation of the bed frame as it appears partly folded.

Figure 6 is a greatly enlarged fragmentary side view of a portion of the bed frame.

Figure 7 is a greatly enlarged fragmentary view of the bed frame in folded position.

Figure 8 is a plan view of a chair embodying this invention.

Figure 9 is a view in front elevation of the device shown in Figure 8.

Figure 10 is a side view in elevation of the chair shown in Figure 8.

Figure 11 is a view in rear elevation of the chair.

Figure 12 is a view of the chair when folded.

Figures 13 to 24, inclusive, are greatly enlarged fragmentary views of portions of the chair frame.

Figures 25 to 28, inclusive, are views of a table embodying this invention.

Figures 29 and 30 are detail views.

Figures 31 to 33, inclusive, are views of a modified form of this invention.

Figures 34 to 37, inclusive, are fragmentary views of a further modified form of this invention.

Like parts are identified by the same reference characters throughout the several views.

Although the invention disclosed herein is shown as applied to foldable frames for beds, chairs, and tables, those skilled in the art will be able to apply such to other articles in which foldable frames are desirable. The general application of this invention is believed to be sufficiently disclosed in the drawings and subsequent description.

The bed frame (Figures 1 to 7, inclusive) includes three pairs of legs, 1, 2 and 3, the legs of each pair being pivotally connected at 4 intermediate their ends. Each side of the frame comprises a pair of horizontal bar members 5 and 6 each pivotally connected with a bracket 7 which is rigidly secured to a leg of the intermediate pair of legs 2. Each of the legs of the end pair of legs 1 and 2 is provided with brackets 8 rigidly connected therewith and pivotally and slidably connected with an adjacent horizontal bar member 5 and 6. This pivotal and slidable connection is clearly shown in Figures 5 to 7, inclusive, in which the horizontal bar members 5 and 6 are each preferably tubular and provided with a pair of elongated apertures 9 adjacent one end and diametrically opposite.

The brackets 8 are tubular and telescopically receive the ends of their respective bars 5 and 6. Provided on each of the brackets 8 are a pair of spaced ears 10 embracing an adjacent bar and connected by a pivot pin 11 extending through apertures 9 and slidable therein. These ears extend in parallel relation to the tubular sockets or openings 12 in the brackets. The horizontal frame bars 5 are each pivotally connected by pins 13 to an adjacent bracket 7 and extend into the hollow portion thereof. One side of the bracket 7 is cut away at 14 to permit the bar 5 to move from the extended position shown in Figures 4 and 7. It will be noticed that in the extended position one end of the bar 5 rests upon one side of the bracket at 15 adjacent the slot 14. The bar 5 is rounded at 16 to permit free movement about its pivot pin 13.

Bars 6 are pivotally connected with their respective brackets 7 by pivot pins 17 and are each provided with elongated apertures 18 within which pins 17 are slidably mounted. Brackets 7 are cut away at 19 to permit pivotal movement of bars 6 about pivot pins 17. When the bars 6 are extended as shown in Figure 6, the rounded end 20 of each bar rests upon the margin 21 of slot 19.

The bars 5 and 6 are all preferably of the same length and the brackets 8 are preferably identical with each other. It will therefore be seen that one side of the frame will be offset relative to the other side, the width of one of the end legs. Therefore, in order to compensate for the differences of positions of pivot pins 11 upon opposite sides of the bed when the legs are nested as shown in Figure 7, the bars 6 are each slotted at 18 to permit such to slide relative to brackets 7 and be positioned in relative alignment end to end with bars 5.

When folding the bed frame, the sides of the frame will be moved to lie adjacent each other as shown in Figure 5 and the bars 5 and 6 will be pulled from their respective sockets or opening 12 in brackets 8 to the position indicated on the right hand of Figure 6. The legs may then be nested adjacent their respective bars as indicated on the left hand of Figure 6. The folding operation will then be completed by pivotal movement of the bars about their respective connections with brackets 7 to their positions shown in Figures 4 and 7.

In the chair shown in Figures 8 to 12, inclusive, a modified form of this invention may be used and is clearly indicated in the enlarged views, Figures 13 to 18, inclusive. Figures 8 to 12, inclusive, are more or less diagrammatic, the details of the invention being shown in Figures 13 to 18, inclusive. The chair frame comprises horizontal seat bars 25 and 26, horizontal back bar 27, pivotally connected leg members 28 and 29, and upright back bars 30 and 31. The bar 27 is pivotally and telescopically connected with the back bar 31 and telescopically connected, only, with the back bar 30. The back bar 31 is pivotally and telescopically connected with the seat bar 26 and the back bar 30 is telescopically and pivotally connected with the seat bar 26. Thus the back bar 30 may be disconnected from the bars 27, permitting the bar 27 to lie adjacent bar 31 and bars 27, 30 and 31 to lie adjacent bar 26. The back bar 30 is connected with bar 31 by a canvas back 32. The seat bar 26 is pivotally and telescopically connected with the legs 28' and 29'. Seat bar 25 is telescopically connected, only, with legs 28" and 29" and is connected with seat bars 26 by a canvas seat 33, thus when the bar 25 is removed from connection with legs 28" and 29", the legs may be nested adjacent the bar 26. The canvas seat 33 may then be wrapped about the nested bars 27, 30, 31 and 26 and legs 28 and 29.

Referring now to Figures 13 to 18, inclusive, the telescopically removable connection between bars 27 and 30 is accomplished by providing a socketed bracket 35 secured to bar 27 and adapted to receive the upper end of bar 30 within the socket. This same type of connection may be used in connecting bar 25 with legs 28" and 29".

Referring now to Figures 16 to 18, inclusive, the pivotal and telescopic connection between bar 27 and bar 31 may be accomplished by a bracket 36 identical in construction to bracket 35 and a link 37 pivotally connected at 38 to bracket 36 and pivotally and slidably connected to bar 31 by a pivot pin 39 slidable in slot 40 in link 37. The bracket 35 telescopically receives the upper end of bar 31 and when the bar 31 is removed from the bracket 35, the pivot pin 39 will be in position at the free end of link 37 and the bar 27 may then be freely moved to lie adjacent bar 31.

In Figures 19 and 20 is shown the combination of elements by means of which the telescopic and pivotal connection may be accomplished between bars 30, 31 and 26, and legs 28' and 29' and bar 26. The angular bracket 45, socketed at both ends to receive telescopically the bars 30 and 31, and legs 28' and 29', is provided with a link 46 pivotally connected therewith by a pivot pin 47 and with the bars 30, 31 by a pivot pin 48 slidable in slot 49 of link 46. The other end of the bracket is provided with a link 50 connected thereto by pivot pin 51. Link 50 is connected with legs 28', 29' by a pivot pin 52 slidable in slot 53 of link 50. This arrangement permits the legs to be nested adjacent the bar 26 when the bars 30 and 31 and the legs 28' and 29' are removed from the sockets of brackets 45.

It is obvious therefore that the chair may be folded into a very compact unit and that none of the parts will be lost as all remain connected whether folded or set up in the form of a chair.

Figures 21 to 24, inclusive, illustrate a method by which the canvas seat 33 may be attached to the seat bar 25 and by which the seat may be lengthened or shortened as desired by the occupant. The seat bar may be constructed of channel iron the sides of which will be provided with a plurality of slots 55 each slot in one side of the channel registering with a slot in the other side of the channel. The margin portion of the canvas adjacent the bar 25, is folded about a steel stiffening bar 56 and secured thereto by rivets 57. These rivets are of sufficient length to be received in slots 55 and to extend across the bar. When the rivets are positioned within the slots as shown the heads thereof will engage the sides of the bar to secure the canvas thereto. To lengthen or shorten the seat, the bar brackets 35 will be removed from the legs 28" and 29" and then unwound or wound about the bar 25 and the brackets replaced upon the legs. Figure 21 shows the seat completely unwound and Figure 22 shows it partially wound about the bar.

The table, Figures 25 and 28, inclusive, is shown diagrammatically and comprises legs arranged in pairs 65 and 66. Each leg of each pair is connected, telescopically and pivotally, with a leg of the other pair by a bar 67. The bars 67 are connected by a canvas 68. The connection between the bars and legs is secured in the same manner as the bars 27 and 31 shown in Figures 16 to 18, inclusive. A bracket 35 is secured to each end of each rod and telescopically receives a leg. Each bracket carries a link 37 pivoted thereto by a pin 38 and provided with a slot 39. The link is pivotally secured to a leg by a pin 39 slidable in slot 40. Thus when the legs are removed from the sockets of the brackets they may be nested adjacent the bars 67. The bars 67 will, however, be previously moved about the pivotal connection of the legs to lie adjacent each other. When the bars and legs have been nested together, the canvas 68 may be wrapped about them and secured thereto in any suitable manner.

Figures 29 and 30 show a foot piece 60 which may be provided upon legs of tubular material to thereby close the end of the tubing resting upon the ground and prevent dirt from packing in the tubing.

Figures 31 to 33 show a frame joint embodying a modified form of this invention. The frame members are constructed of channel iron. The bar 70 is provided in its bottom wall with an aperture 71 and with a pin 72 extending across the channel. Bar 73 is provided in its channel walls with elongated apertures 74 which receive slidably the pin 72. The bottom of the channel is extended beyond the sides thereof to provide tongue 75. Secured to the bottom of the channel at 76 and positioned within the channel is a spring 77 which engages pin 72. In Figure 32 the channel bars are shown in nested relation. When they are moved to the relative position shown in Figure 31, the tongue 75 will ride on the bottom of channel bar 70 and the slots 74 will permit the bar 73 to slide on pin 72 thereby permitting the tongue to enter aperture 71. The spring 77 will then draw the tongue 75 into the slot and the bars will be held in perpendicular relation. When it is desired to again nest the bars the tongue will be removed from aperture 71 in an obvious manner.

The modified form of this invention shown in Figures 34 to 37, inclusive, is applied to an ordinary wood table top 80. Attached to the table top is a bracket 81 having a downwardly projecting tongue 82 provided with an elongated aperture 83. Pivotally connected with the bracket tongue 82 is a leg 84. This leg is preferably tubular and telescopically receives the tongue 82, one side being cut away at 85 to permit the leg to swing in one direction from parallel relation to the tongue. The leg is carried by a pivot pin 86 slidable in aperture 83 and is provided with an aperture 87 opposite to the cut-away portion 85.

When it is desired to place the leg 84 in parallel relation to the table top 80 as shown in Figure 36, the leg will be moved downwardly until the pin 86 is positioned at the lower end of aperture 83. The tongue then will be withdrawn from the interior of the leg which may be swung about its pivot until the aperture 87 is in registry with the end of the tongue. When this position is reached the leg will be moved upwardly to position the tongue 82 in aperture 87 as shown in Figure 36. In such position the margin of the aperture 87 will be engaged with the tongue and will hold the leg in substantially parallel relation to the table top.

From the foregoing description it will be apparent that a frame has been provided which may be folded into a compact unit and that a novel pivotal and telescopic connection is provided between the frame members which permits the members to be interlocked in operative or folded positions.

It is also apparent that a frame embodying this invention may be very sturdy in structure and be cheaply manufactured.

I claim:

1. In a foldable frame, a pair of legs pivotally connected intermediate their ends and positioned laterally of each other, a bracket secured to each of said legs, and a plurality of bars substantially of equal length each pivotally secured to one of said brackets, said bars being arranged in pairs with the bars of each pair projecting in opposite directions from said bracket, one of the bars of each pair having its pivot mounted in an elongated slot, whereby said frame may be folded into a compact unit with its bars disposed in substantially end to end alignment.

2. In a foldable frame, a pair of intermediate legs pivotally connected intermediate their ends and positioned laterally of each other, a bracket secured to each of said legs, a plurality of bars substantially of equal length each pivotally secured to one of said brackets, said bars being arranged in pairs with the bars of each pair projecting in opposite directions from said bracket, one of the bars of each pair having its pivot mounted in an elongated slot, whereby said frame may be folded into a compact unit with its bars disposed in substantially end to end alignment, a pair of end legs disposed on each side of said intermediate legs and each end leg being pivotally connected with one of said bars.

RICHARD G. WEDEMANN.